United States Patent
Takato

[11] Patent Number: 5,970,266
[45] Date of Patent: Oct. 19, 1999

[54] REAL IMAGE MODE VARIABLE MAGNIFICATION FINDER

[75] Inventor: Hideyasu Takato, Hino, Japan

[73] Assignee: Olympus Optical Co. Ltd., Tokyo, Japan

[21] Appl. No.: 09/026,533

[22] Filed: Feb. 20, 1998

[30] Foreign Application Priority Data

Feb. 20, 1997 [JP] Japan ..................................... 9-036263

[51] Int. Cl.$^6$ ..................................................... G03B 13/10
[52] U.S. Cl. ........................... 396/379; 359/432; 359/676
[58] Field of Search ..................................... 396/373, 378,
396/379, 382; 359/422, 432, 676, 680,
682, 784; 348/341

[56] References Cited

U.S. PATENT DOCUMENTS 5,257,129  10/1993  Morooka et al. .

FOREIGN PATENT DOCUMENTS

5-34595   2/1993  Japan .
6-160709  6/1994  Japan .
6-214159  8/1994  Japan .
7-49452   2/1995  Japan .

*Primary Examiner*—Howard B. Blankenship
*Attorney, Agent, or Firm*—Pillsbury Madison & Sutro LLP

[57] ABSTRACT

A real image mode variable magnification finder includes an objective system having a positive refracting power, an image erecting optical system for erecting an image formed by the objective system, and an eyepiece system having a positive refracting power. The objective system is composed of a first lens unit of a negative biconcave lens, a second lens unit of a positive lens, and a third lens unit of a positive meniscus lens with a convex surface directed toward the image side. The first lens unit is fixed and the second and third lens units are moved along the optical axis, thereby changing the magnification of the finder. In this way, the real image mode variable magnification finder of wide-angle design can be provided which is compact in size, has a high variable magnification ratio, and exhibits excellent performance for correction for aberration.

6 Claims, 12 Drawing Sheets

-1.00(diop)1.00

FIG. 3B
ω = 33.53°

-1.00(diop)1.00

-1.00(diop)1.00

FIG. 4B
ω = 20.77°

-1.00(diop)1.00

ND VARIABLE
REAL IMAGE MODE VARIABLE MAGNIFICATION FINDER

BACKGROUND OF THE INVENTION

1. Field of the Invention

This invention relates to a real image mode variable magnification finder used in a lens shutter camera, a still video camera, or the like.

2. Description of Related Art

In general, a finder optical system which is constructed independently of a photographing optical system as in a lens shutter camera is often used in a virtual image mode finder. The virtual image mode finder, however, has the problem that if it is designed so that a variable magnification ratio increases, the diameter of a front lens must be enlarged and the view of a visual field peculiar to the finder of this type becomes unclear.

A real image mode finder, by contrast, is such that the diameter of the front lens can be diminished because an entrance pupil can be located in the forward part of the finder. Furthermore, since an image formed by an objective system is observed through an eyepiece system, the defect of the virtual image mode finder is practically obviated, and thus a finder with a good view of a field frame can be obtained.

Today, many of lens shutter cameras having variable magnification functions employ such real image mode finders. However, if an attempt is made to attain a wide-angle finder with a variable magnification ratio in excess of 2, it will be imperative to use a three-lens unit zoom system. Such finders are available in various types. In particular, each of Japanese Patent Preliminary Publication Nos. Hei 5-34595, Hei 6-160709, and Hei 6-214159 discloses a finder in which an objective system is constructed with the three-lens unit zoom system composed of lens units of negative, positive, and positive powers.

The finder disclosed in Hei 5-34595 has a half angle of view of incidence of at least 30° at the wide-angle position and a variable magnification ratio as large as about 2.5, which come under the classes of a wide angle of view and a high variable magnification ratio, respectively. The objective system of this finder particularly includes a second lens unit of a positive meniscus lens with a convex surface directed toward the object side and a third lens unit of a biconvex lens. With such a configuration, when the magnification of the finder is changed, ranging from the wide-angle position to the telephoto position, the amount of movement of the second lens unit increases in the vicinity of the wide-angle position. For this reason, a restriction on a driving mechanism for moving the lens is widened, and it becomes difficult that the magnification is changed in association with a photographic lens. Moreover, the finder has the drawback that its pupil diameter is as small as 4 mm, thus making it difficult to look through the finder.

The finder disclosed in Hei 6-160709 is designed to simplify a zoom mechanism in such a way that only the second lens unit of the objective system is moved. However, its variable magnification ratio is less than 2, and hence it cannot be positively said that this finder is satisfactory for practical use.

The finder set forth in Hei 6-214159 is such that its variable magnification ratio is more than 2.5, but the half angle of view of incidence is as small as nearly 25° at the wide-angle position. Although this publication also discloses a finder with a half angle of view of incidence of more than 30° at the wide-angle position, the variable magnification ratio of this finder is below 2, which is unsatisfactory for practical use.

SUMMARY OF THE INVENTION

It is, therefore, an object of the present invention to provide a real image mode variable magnification finder which has a wide angle of view and a high variable magnification ratio, but is small in size and high in performance.

In order to achieve this object, according to one aspect of the present invention, the real image mode variable magnification finder comprises, in order from the object side, an objective system having a positive refracting power, an image erecting optical system for erecting an image formed by the objective system, and an eyepiece system having a positive refracting power. The objective system includes, in order from the object side, a first lens unit of a negative biconcave lens, a second lens unit of a positive lens, and a third lens unit of a positive meniscus lens with a convex surface directed toward the image side. An arrangement is made such that the first lens unit is fixed and the second and third lens units are moved along the optical axis to thereby change the magnification of the finder.

According to another aspect of the present invention, the real image mode variable magnification finder comprises, in order from the object side, an objective system having a positive refracting power, an image erecting optical system for erecting an image formed by the objective system, and an eyepiece system having a positive refracting power. The objective system includes, in order from the object side, a first lens unit with a negative refracting power, a second lens unit with a positive refracting power, and a third lens unit with a positive refracting power and is designed to satisfy the following conditions:

$$|HF| < HB \quad (1)$$

$$0.2 < fw/f_3 < 0.8 \quad (2)$$

where HF is the primary principal point position of the second lens unit, HB is the secondary principal point position of the third lens unit, fw is the focal length of the objective system when an arbitrary point is taken as a reference in the process of a magnification change ranging from the wide-angle position to the middle position of the finder, and $f_3$ is the focal length of the third lens unit.

Also, the real image mode variable magnification finder in the foregoing may be constructed so that the first lens unit of the objective system is a biconcave lens and the third lens unit is a positive meniscus lens with a convex surface directed toward the image side.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

The real image mode variable magnification finder of the present invention comprises, in order from the object side, an objective system having a positive refracting power, an image erecting optical system for erecting an image formed by the objective system, and an eyepiece system having a positive refracting power. In particular, the objective system includes, in order from the object side, a first lens unit of a negative biconcave lens, a second lens unit of a positive lens, and a third lens unit of a positive meniscus lens with a convex surface directed toward the image side.

Basically, in the real image mode variable magnification finder of the present inventions the first lens unit of the objective system is fixed and the second and third lens units are moved along the optical axis, thereby changing the magnification of the finder. It is, of course, possible that all the lens units of the objective system are moved to change the magnification.

A condition required for determining the amount of movement of the second lens unit largely depends on the configuration of the third lens unit. When the third lens unit, as mentioned above, is constructed with the positive meniscus lens with the convex surface directed toward the image side, the primary principal point position of the third lens can be separated from the second lens unit, compared with the case of biconvex lens.

Consequently, in contrast with a conventional zoom finder having an objective system in which the lens units of negative, positive, and positive powers are arranged in that order from the object side, the finder of the present invention is capable of decreasing the amount of movement of the second lens unit in the vicinity of the wide-angle position. Thus, in the process of the magnification change ranging from the wide-angle position to the telephoto position, it becomes possible to move the second lens unit along a nearly straight line. Moreover, a driving mechanism for moving the lens units in the magnification change does not become complicated.

In this case, it is desirable that the second lens unit is constructed with a positive lens with a convex surface directed toward the object side. In addition, if the second lens unit is a positive meniscus lens or biconvex lens, the amount of movement of the second lens unit can easily be controlled together with the configuration of the third lens unit. The use of the biconvex lens in the second lens unit is further desirable because the number of degrees of freedom is afforded, to a certain extent, to the configuration of the third lens unit.

By constructing the first lens unit with the biconcave lens, off-axis aberration caused by a wide-angle design is easily controlled in particular and the first lens unit can be fixed during zooming. In this way, it becomes possible to simplify the design of the entire camera.

The real image mode variable magnification finder of the present invention is designed so that, in order to reduce the entire length of the finder, the refracting powers and the principal point positions of respective lens units of the objective system are favorably controlled to decrease the amount of movement of the second lens unit. For this purpose, it is necessary to satisfy the condition of Eq. (1).

Figure 1:
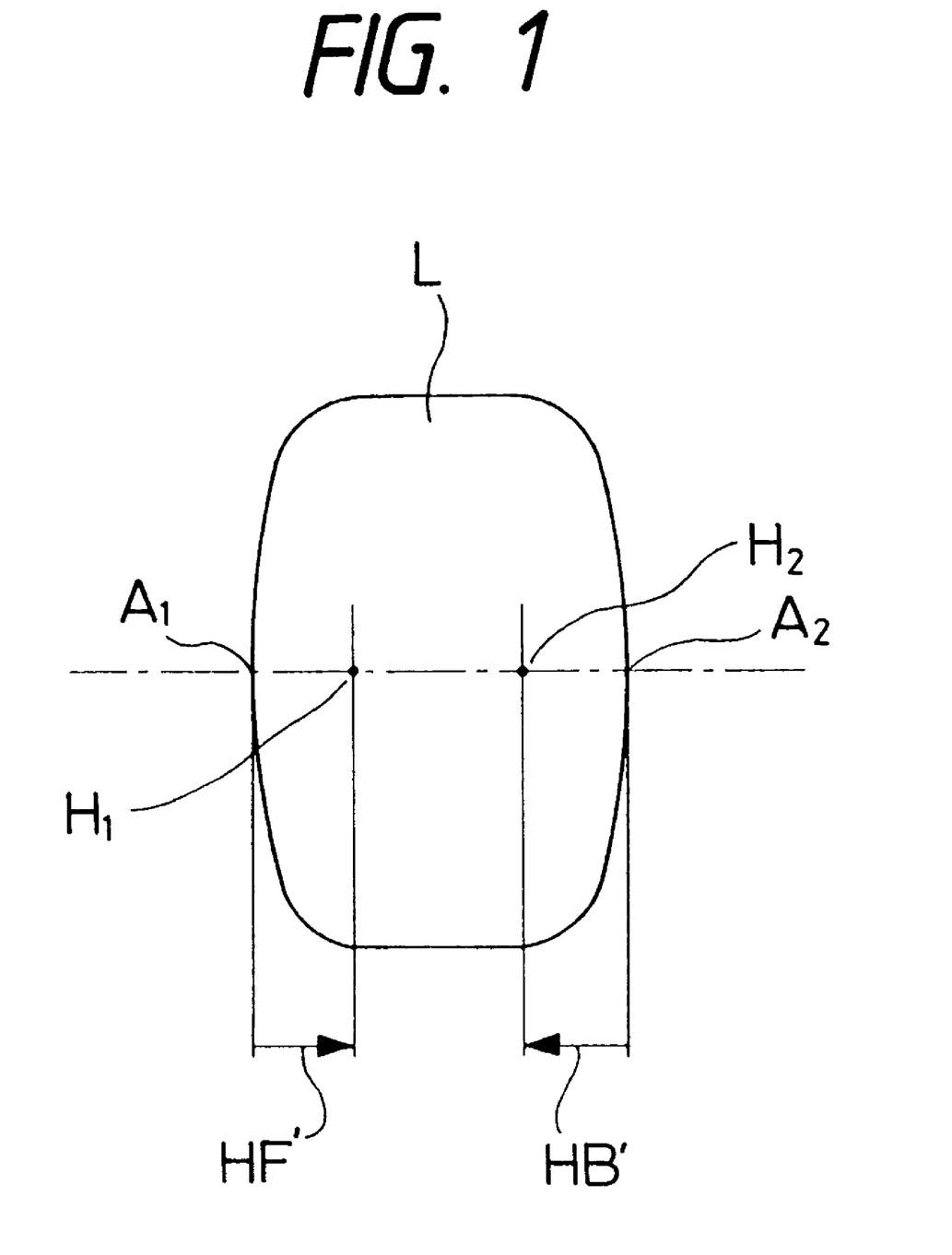
FIG. 1 is a view for explaining the primary and secondary principal point positions of a lens.

Here, in the present invention, as shown in FIG. 1, a primary principal point position HF' stands for a distance from a vertex $A_1$ of the front surface of a lens L to a primary principal point $H_1$. Similarly, a secondary principal point position HB' indicates a distance from a vertex $A_2$ of the rear surface of the lens L to a secondary principal point $H_2$.

Furthermore, it is desirable that the real image mode variable magnification finder of the present invention satisfies the condition of Eq. (2).

Eq. (1) refers to the principal point positions of the second and third lens units, and a distance between these lens units is determined by controlling a distance between their respective principal points. If the values of the principal point positions HF and HB are within the limit of Eq. (1), the secondary principal point of the third lens unit will be located behind the third lens unit, and thus the position of the principal point of the third lens unit can be separated from the second lens unit. Hence, even when the second and third lens units are not arranged so as to have a certain distance therebetween in the vicinity of the wide-angle position, a wide-angle objective system can be obtained.

Conversely, if the values of the principal point positions HF and HB exceed the limit of Eq. (1), the distance between the principal points of the second and third lens units will be reduced. Thus, if an attempt is made to increase this distance and obtain a wide angle of view in the vicinity of the wide-angle position, the second lens unit must be widely moved.

When Eq. (1) is satisfied, however, a zoom drive ceases to be restricted and the lens units of the objective system can be moved in association with the photographic lens during zooming. In this way, the simplification of the mechanism of the zoom drive is intended.

Eq. (2) refers to the refracting power of the third lens unit. If the value of $fw/f_3$ exceeds the upper limit of Eq. (2), the refracting power of the third lens unit will be diminished and the entire length of the finder will be increased, resulting in less compactness of the camera. On the other hands if the value of $fw/f_3$ is below the lower limit, the refracting power of the third lens unit will be extremely strengthened, and in particular, spherical aberration is considerably deteriorated at the telephoto position.

Also, if Eq. (2) is defined as the following condition, a larger effect will be secured:

$$0.3 < fw'/f_3 < 0.5 \quad (3)$$

where fw' is the focal length of the objective system at the wide-angle position.

The real image mode variable magnification finder of the present invention achieves the purpose of obtaining a wide angle of view at the wide-angle position. As a result, negative distortion is liable to occur at the wide-angle position. An aspherical lens is thus used in the first lens unit to correct for this negative distortion. Additionally, the aspherical lens can, at the same time, be corrected for coma at the wide-angle position. In this way, the use of the aspherical lens in the first lens unit brings about a high-performance finder.

If the aspherical lens is used in the third lens unit as well, coma can be favorably corrected at the telephoto position. If both surfaces of the third lens unit are configured to be aspherical, the effect of correction for aberration will be further heightened. In particular, even when the variable magnification ratio is high as in the real image mode variable magnification finder of the present invention, aberration can be favorably corrected.

Here, if each of the lens units of the objective system is constructed with a single lens, this will bring about the advantage of reducing the entire length of the objective system. Since an increase of the number of lenses causes a rise in cost, it is desirable that each lens unit of the objective system is constructed with a single lens as far as possible.

The objective system of the real image mode variable magnification finder of the present invention is such that when the magnification of the finder is changed, it is chiefly changed by the second lens unit and a diopter correction is made by the third lens unit. Moreover, if the first lens unit is added to movable lens units, a wide angle of view will be more easily brought about.

The real image mode variable magnification finder of the present invention, because its pupil diameter $\phi$ is set to 5 mm, does not possess the drawback that it is difficult to look through the finder, and is most suitable for use in a compact camera requiring easy photography in particular.

In accordance with the embodiments shown in the drawings, the present invention will be explained in detail below.

First Embodiment

Figure 2A:
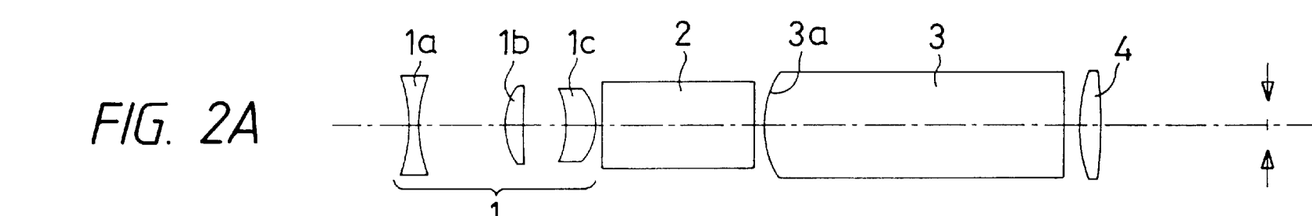
FIGS. 2A, 2B, and 2C are sectional views showing arrangements, each developed along the optical axis, at wide-angle, middle, telephoto positions, respectively, of the real image mode variable magnification finder of a first embodiment in the present invention.
Figures 2B, 2C:
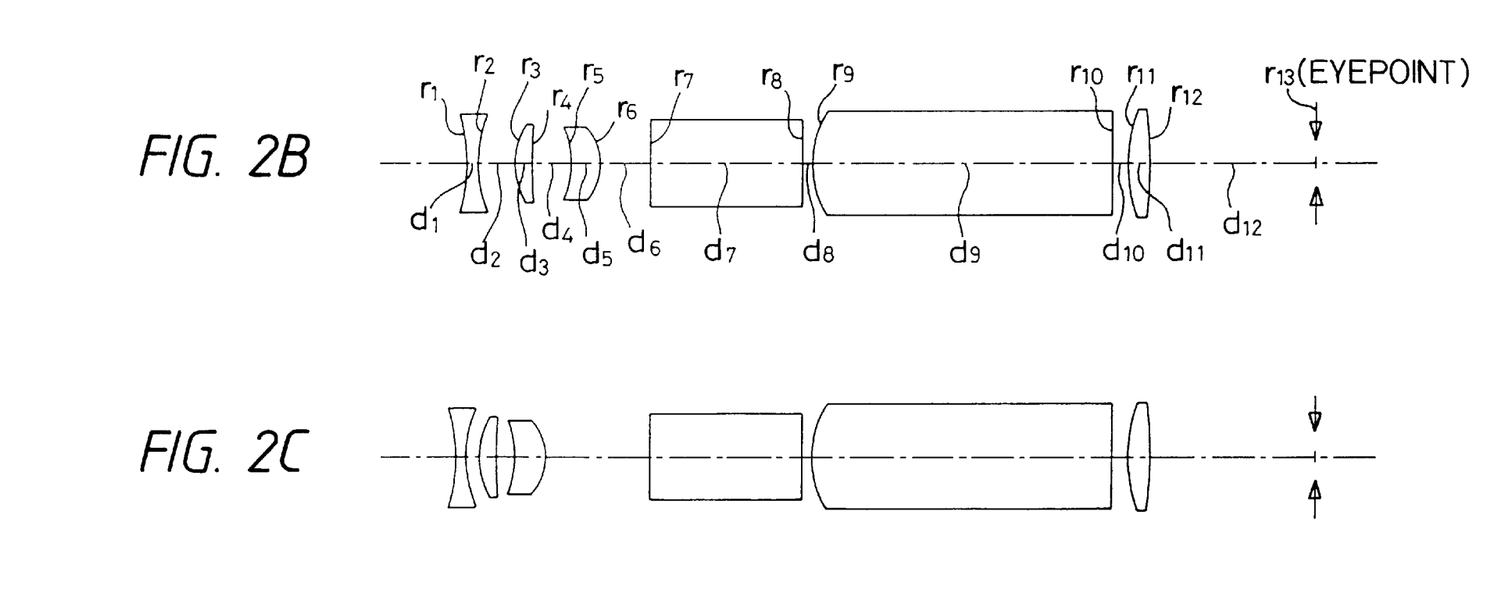
Figure 3A:
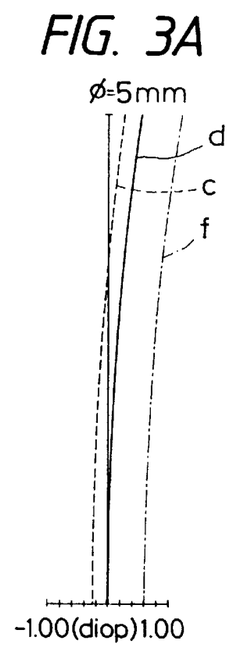
FIGS. 3A, 3B, and 3C are diagrams showing spherical aberration, astigmatism, and distortion, respectively, at the wide-angle position of the real image mode variable magnification finder of the first embodiment.
Figure 3B:
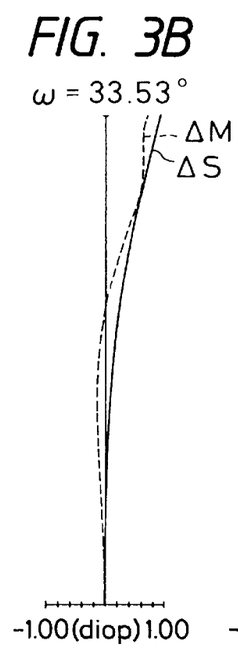
Figure 3C:
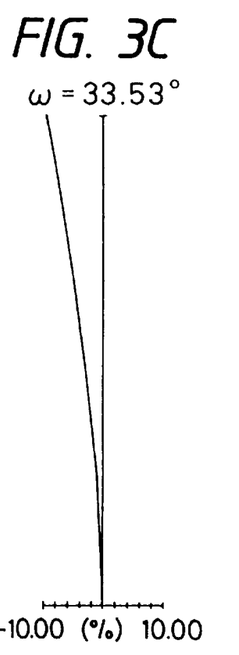
Figure 4A:
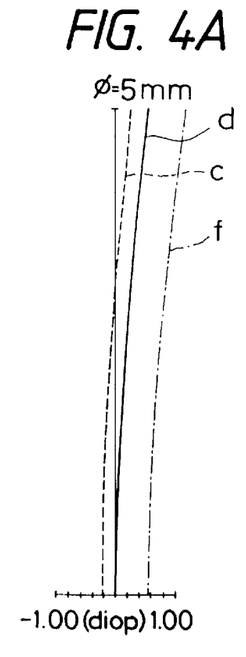
FIGS. 4A, 4B, and 4C are diagrams showing spherical aberration, astigmatism, and distortion, respectively, at the middle position of the real image mode variable magnification finder of the first embodiment.
Figure 4B:
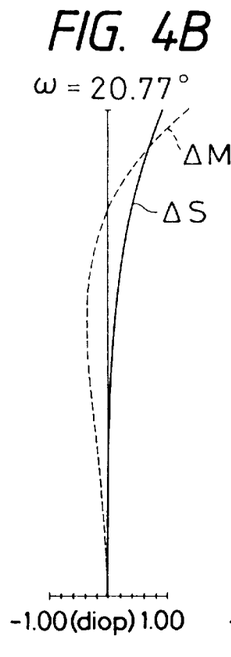
Figure 4C:
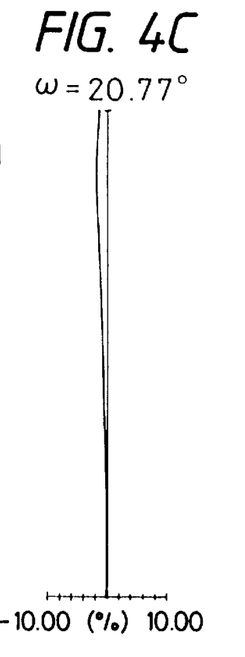
Figure 5A:
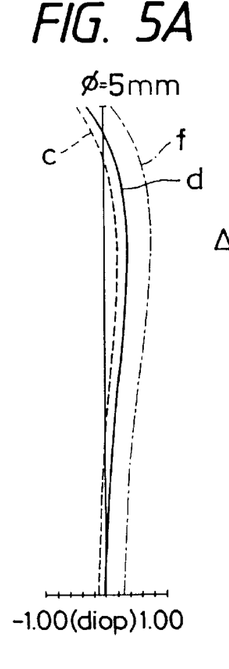
FIGS. 5A, 5B, and 5C are diagrams showing spherical aberration, astigmatism, and distortion, respectively, at the telephoto position of the real image mode variable magnification finder of the first embodiment.
Figure 5B:
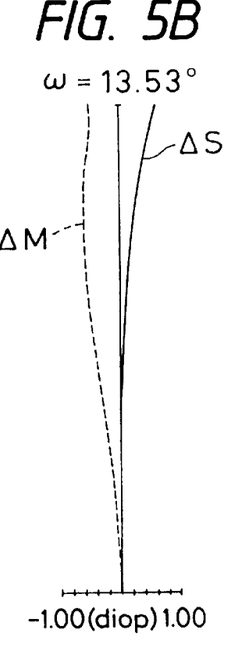
Figure 5C:
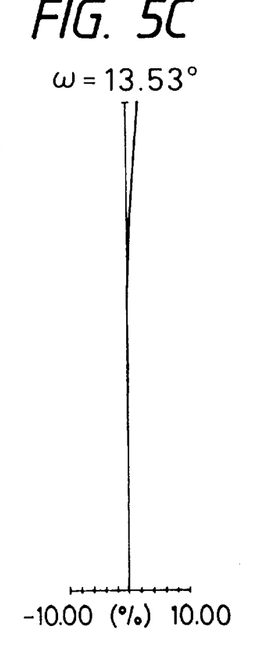

In FIGS. 2A, 2B, and 2C, the finder of this embodiment comprises, in order from the object side, an objective system 1 having a positive refracting power, prisms 2 and 3 for erecting an image, and an eyepiece system 4 having a positive refracting power. The objective system 1 includes, in order from the object side, a first lens unit 1a of a biconcave lens, having a negative refracting power; a second lens unit 1b of a positive meniscus lens with a convex surface directed toward the object side; and a third lens unit 1c of a positive meniscus lens with a convex surface directed toward the image side. Any of these lens units is constructed with a single lens. An object image is formed, by the objective system 1, close to an entrance surface 3a of the prism 3 for erecting the image. The entrance surface 3a of the prism 3 has the function of a field lens.

In the finder of the first embodiment, the magnification is changed by moving the first, second, and third lens units 1a, 1b, and 1c along the optical axis. Ashperical surfaces are employed for a surface, directed toward the object side, of the first lens unit 1a; a surface, directed toward the object side, of the second lens unit 1b; both surfaces of the third lens unit 1c; and a surface, directed toward the object side, of the eyepiece system 4.

The following is numerical data of the real image mode variable magnification finder of the first embodiment and of optical members, such as lenses, constituting the finder.

Magnification  0.30 × (wide-angle)-0.48 × (middle)-0.73 × (telephoto)
Half angle of view ($\omega$)  33.53°(wide-angle)-20.77°(middle)-13.53°(telephoto)
Pupil diameter ($\phi$)  5 mm
$r_1 = -10.413$(aspherical)
  $d_1 = 1.00$   $n_1 = 1.58423$   $v_1 = 30.49$
$r_2 = 9.679$
  $d_2 = 8.54$(wide-angle), 3.68(middle), 1.26(telephoto)
$r_3 = 5.499$(aspherical)
  $d_3 = 1.80$   $n_3 = 1.49241$   $v_3 = 57.66$
$r_4 = 71.492$
  $d_4 = 4.13$(wide-angle), 3.66(middle), 1.74(telephoto)
$r_5 = -14.955$(aspherical)
  $d_5 = 2.89$   $n_5 = 1.49241$   $v_5 = 57.66$
$r_6 = -5.285$(aspherical)
  $d_6 = 0.60$(wide-angle), 4.90(middle), 10.33(telephoto)
$r_7 = \infty$
  $d_7 = 14.65$   $n_7 = 1.52542$   $v_7 = 55.78$
$r_8 = \infty$
  $d_8 = 1.00$ -continued $r_9 = 9.102$
  $d_9 = 29.50$   $n_9 = 1.52542$   $v_9 = 55.78$
$r_{10} = \infty$
  $d_{10} = 1.55$
$r_{11} = 12.554$(aspherical)
  $d_{11} = 2.10$   $n_{11} = 1.49241$   $v_{11} = 57.66$
$r_{12} = -61.222$
  $d_{12} = 16.50$
$r_{13}$(eyepoint)
Conic constants and aspherical coefficients
First Surface $\kappa = 0$
$A_4 = 6.72145 \times 10^{-4}, A_6 = 2.36280 \times 10^{-5}$,
$A_8 = -2.32149 \times 10^{-6}, A_{10} = 5.83859 \times 10^{-8}$
Third Surface $\kappa = 0$
$A_4 = -5.20754 \times 10^{-4}, A_6 = -5.86045 \times 10^{-5}$,
$A_8 = 7.33729 \times 10^{-6}, A_{10} = -4.78579 \times 10^{-7}$
Fifth surface $\kappa = 0$
$A_4 = -3.57807 \times 10^{-3}, A_6 = -3.27918 \times 10^{-5}$,
$A_8 = -1.51508 \times 10^{-5}, A_{10} = 1.85175 \times 10^{-6}$
Sixth surface $\kappa = 0$
$A_4 = -9.45186 \times 10^{-4}, A_6 = 1.64627 \times 10^{-5}$,
$A_8 = -3.33427 \times 10^{-6}, A_{10} = 4.42304 \times 10^{-7}$
Eleventh surface $\kappa = 0$
$A_4 = -1.19360 \times 10^{-4}, A_6 = 1.90290 \times 10^{-6}$,
$A_8 = -6.89420 \times 10^{-8}, A_{10} = 6.74820 \times 10^{-10}$ The constant values of Eqs. (1), (2), and (3) in the real image mode variable magnification finder of the first embodiment are as follows:

HF=−0.10, HB=0.96 fw'/f$_3$=0.42 (fw'=6.31, f$_3$=15.11)

FIGS. 3A–3C, 4A–4C, and 5A–5C show aberration curves at the wide-angle, middle, and telephoto positions, respectively, of the real image mode variable magnification finder of the first embodiment.

Second Embodiment

Figure 6A:
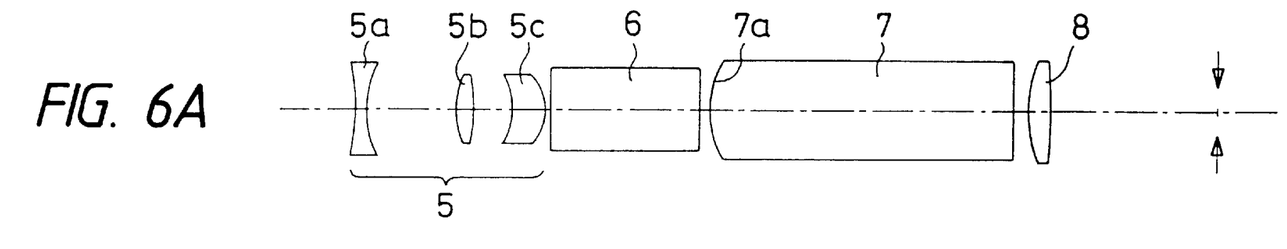
FIGS. 6A, 6B, and 6C are sectional views showing arrangements, each developed along the optical axis, at wide-angle, middle, telephoto positions, respectively, of the real image mode variable magnification finder of a second embodiment in the present invention.
Figure 6B:
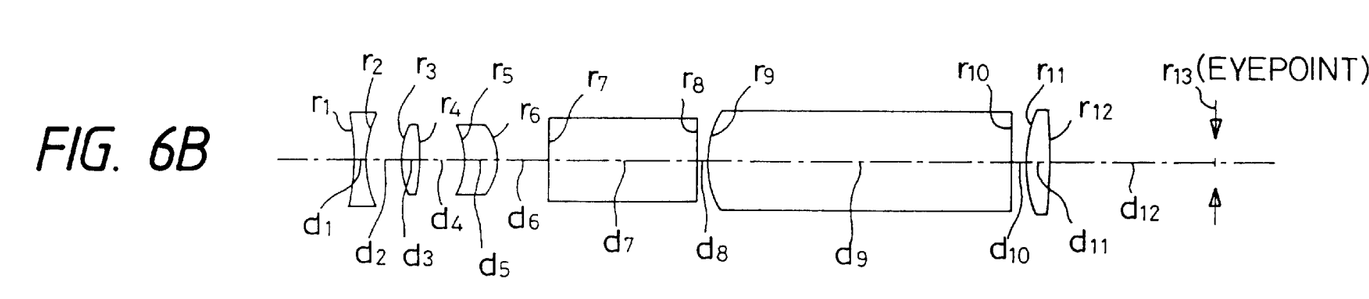
Figure 6C:
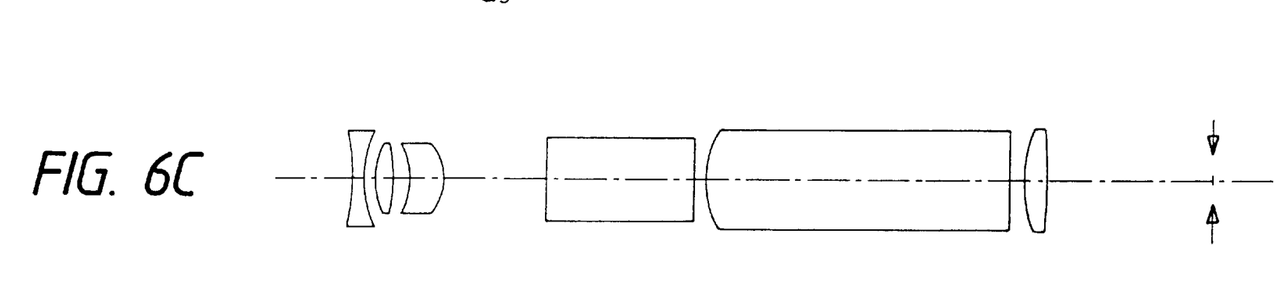
Figure 7A:
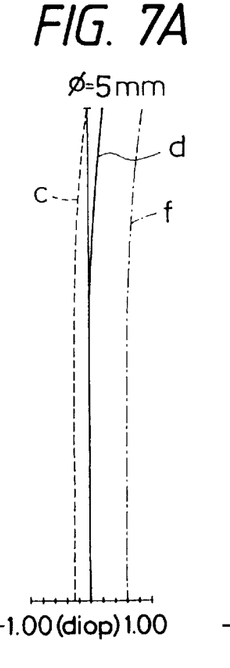
FIGS. 7A, 7B, and 7C are diagrams showing spherical aberration, astigmatism, and distortion, respectively, at the wide-angle position of the real image mode variable magnification finder of the second embodiment.
Figure 7B:
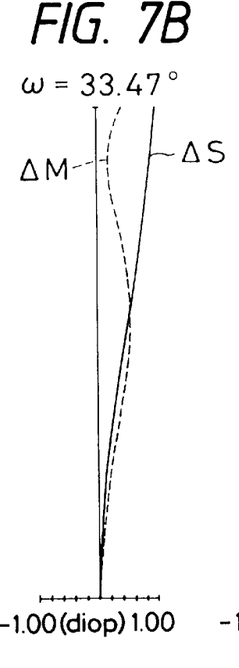
Figure 7C:
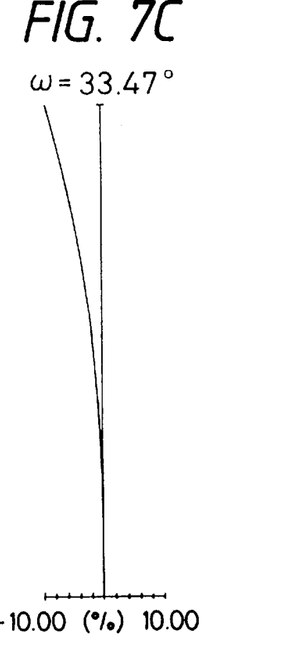
Figure 8A:
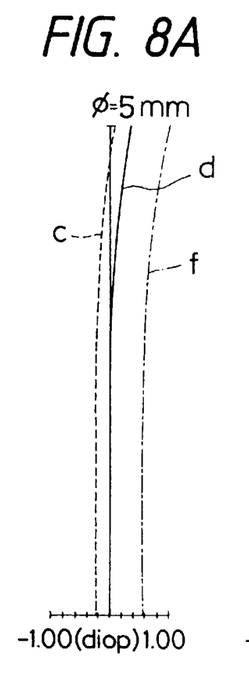
FIGS. 8A, 8B, and 8C are diagrams showing spherical aberration, astigmatism, and distortion, respectively, at the middle position of the real image mode variable magnification finder of the second embodiment.
Figure 8B:
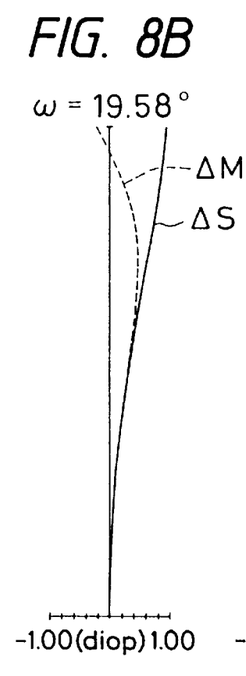
Figure 8C:
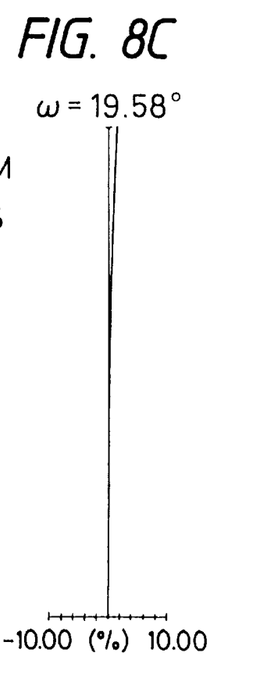
Figure 9A:
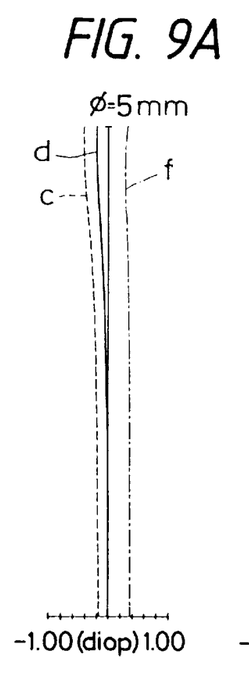
FIGS. 9A, 9B, and 9C are diagrams showing spherical aberration, astigmatism, and distortions respectively, at the telephoto position of the real image mode variable magnification finder of the second embodiment.
Figure 9B:
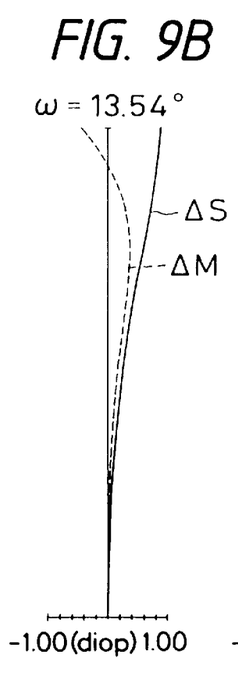
Figure 9C:
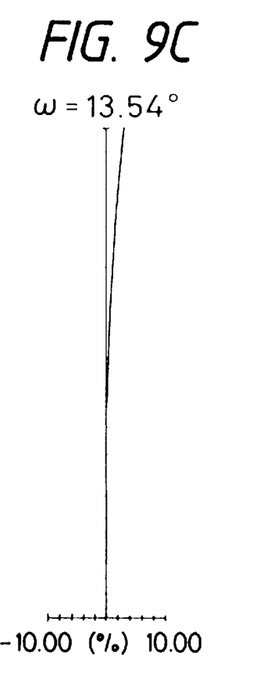

In FIGS. 6A, 6B, and 6C, the finder of this embodiment comprises, in order from the object side, an objective system 5 having a positive refracting power, prisms 6 and 7 for erecting an image, and an eyepiece system 8 having a positive refracting power. The objective system 5 includes, in order from the object side, a first lens unit 5a of a biconcave lens, having a negative refracting power; a second lens unit 5b of a biconvex lens, having a positive refracting power; and a third lens unit 5c of a positive meniscus lens with a convex surface directed toward the image side. Any of these lens units is constructed with a single lens. An object image is formed, by the objective system 5, close to an entrance surface 7a of the prism 7 for erecting the image. The entrance surface 7a of the prism 7 has the function of a field lens.

In the finder of the second embodiments the magnification is changed by moving the second and third lens units 5b and 5c along the optical axis. Ashperical surfaces are employed for a surface, directed toward the object side, of the first lens unit 5a; a surface, directed toward the object side, of the second lens unit 5b; both surfaces of the third lens unit 5c; and a surface, directed toward the object side, of the eyepiece system 8.

The following is numerical data of the real image mode variable magnification finder of the second embodiment and of optical members, such as lenses, constituting the finder.

Magnification     0.29 × (wide-angle)-0.49 × (middle)-
                  0.70 × (telephoto)
Half angle of view (ω)  33.47°(wide-angle)-19.58°(middle)-
                  13.54°(telephoto)
Pupil diameter (φ)     5 mm
$r_1 = -12.319$(aspherical)
  $d_1 = 1.00$   $n_1 = 1.58423$   $v_1 = 30.49$
$r_2 = 8.540$
  $d_2 = 8.80$(wide-angle), 3.66(middle), 1.25(telephoto)
$r_3 = 7.603$ (aspherical)
  $d_3 = 1.68$   $n_3 = 1.49241$   $v_3 = 57.66$
$r_4 = -16.767$
  $d_4 = 3.72$(wide-angle), 4.46(middle), 1.69(telephoto)
$r_5 = -8.484$(aspherical)
  $d_5 = 3.21$   $n_5 = 1.49241$   $v_5 = 57.66$
$r_6 = -4.758$(aspherical)
  $d_5 = 0.59$(wide-angle), 5.00(middle), 10.16(telephoto)
$r_7 = \infty$
  $d_7 = 14.35$   $n_7 = 1.52542$   $v_7 = 55.78$
$r_8 = \infty$
  $d_8 = 1.20$
$r_9 = 9.102$
  $d_9 = 29.50$   $n_9 = 1.52542$   $v_9 = 55.78$
$r_{10} = \infty$
  $d_{10} = 1.55$
$r_{11} = 12.554$(aspherical)
  $d_{11} = 2.10$   $n_{11} = 1.49241$   $v_{11} = 57.66$
$r_{12} = -61.222$
  $d_{12} = 16.50$
$r_{13}$(eyepoint)
Conic constants and aspherical coefficients
First surface $\kappa = 0$
$A_4 = 1.23606 \times 10^{-3}, A_6 = -9.14606 \times 10^{-5}$,
$A_8 = 4.37143 \times 10^{-6}, A_{10} = -8.20120 \times 10^{-8}$
Third surface $\kappa = 0$
$A_4 = -6.23293 \times 10^{-4}, A_6 = -3.99039 \times 10^{-6}$,
$A_8 = 6.61955 \times 10^{-6}, A_{10} = -5.02208 \times 10^{-7}$
Fifth surface $\kappa = 0$
$A_4 = -3.25812 \times 10^{-3}, A_6 = -7.10093 \times 10^{-6}$,
$A_8 = -8.58985 \times 10^{-6}, A_{10} = 1.38858 \times 10^{-7}$
Sixth surface $\kappa = 0$
$A_4 = -4.56725 \times 10^{-4}, A_6 = 1.92190 \times 10^{-5}$,
$A_8 = 5.98359 \times 10^{-7}, A_{10} = -7.09479 \times 10^{-8}$
Eleventh surface $\kappa = 0$
$A_4 = -1.19360 \times 10^{-4}, A_6 = 1.90290 \times 10^{-6}$,
$A_8 = -6.89420 \times 10^{-8}, A_{10} = 6.74820 \times 10^{-10}$ The constant values of Eqs. (1), (2), and (3) in the real image mode variable magnification finder of the second embodiment are as follows:

HF=0.36, HB=2.14 fw'/f$_3$=0.36 (fw'=6.16, f$_3$=17.13)

FIGS. 7A–7C, 8A–8C, and 9A–9C show aberration curves at the wide-angle, middle, and telephoto positions, respectively, of the real image mode variable magnification finder of the second embodiment.

Third Embodiment

Figure 10A:
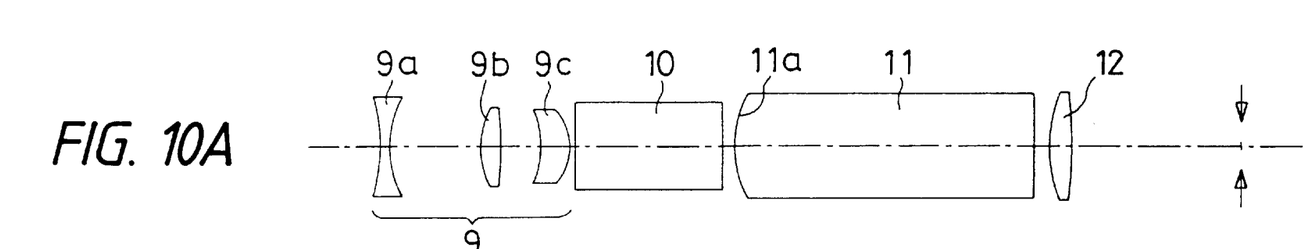
FIGS. 10A, 10B, and 10C are sectional views showing arrangements, each developed along the optical axis, at wide-angle, middle, telephoto positions, respectively, of the real image mode variable magnification finder of a third embodiment in the present invention.
Figure 10B:
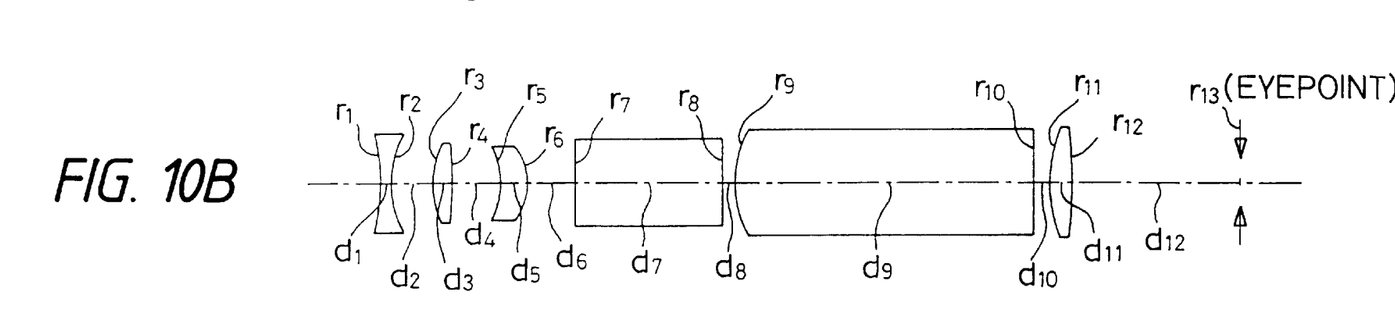
Figure 10C:
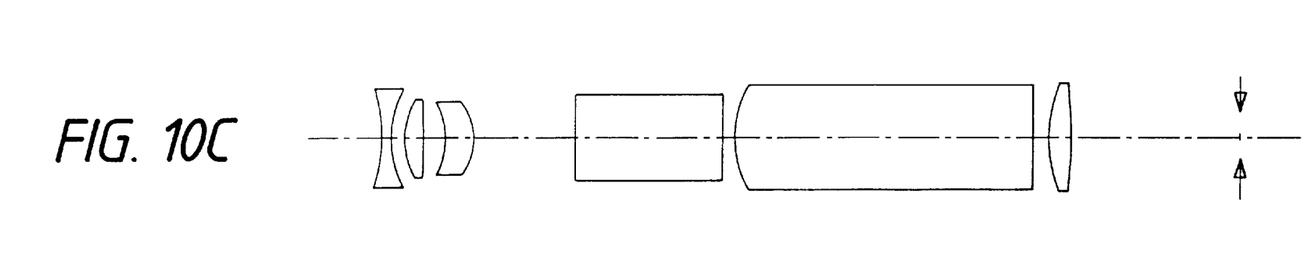
Figure 11A:
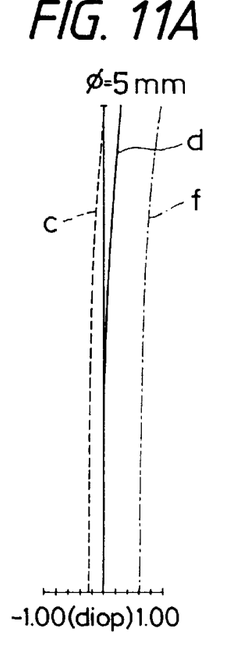
FIGS. 11A, 11B, and 11C are diagrams showing spherical aberration, astigmatism, and distortion, respectively, at the wide-angle position of the real image mode variable magnification finder of the third embodiment.
Figure 11B:
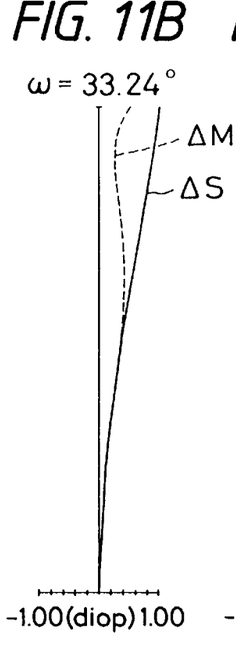
Figure 11C:
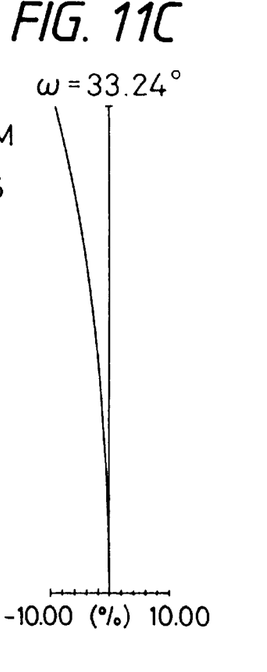
Figure 12A:
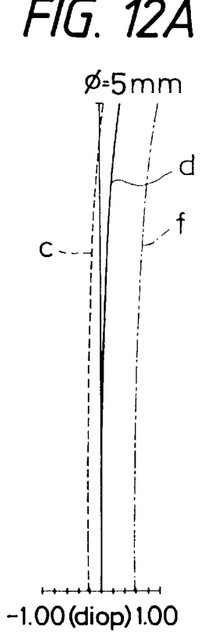
FIGS. 12A, 12B, and 12C are diagrams showing spherical aberration, astigmatism, and distortion, respectively, at the middle position of the real image mode variable magnification finder of the third embodiment.
Figure 12B:
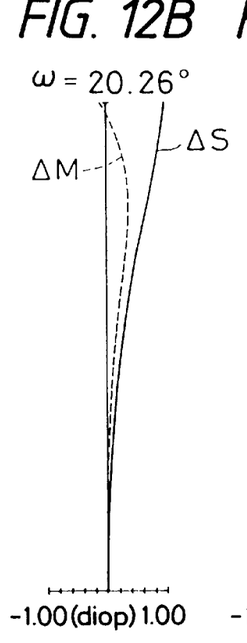
Figure 12C:
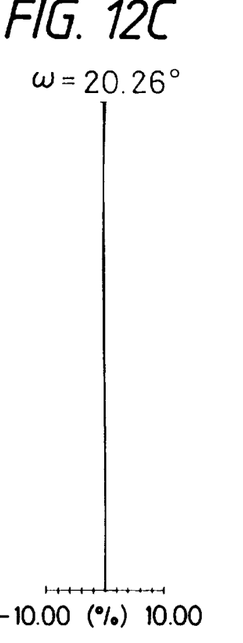
Figure 13A:
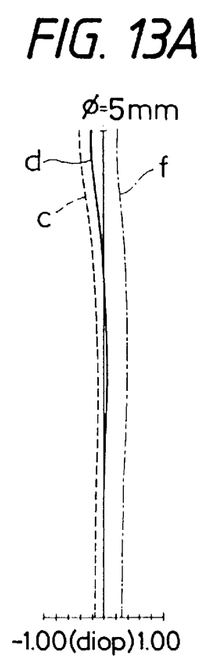
FIGS. 13A, 13B, and 13C are diagrams showing spherical aberration, astigmatism, and distortion, respectively, at the telephoto position of the real image mode variable magnification finder of the third embodiment.
Figure 13B:
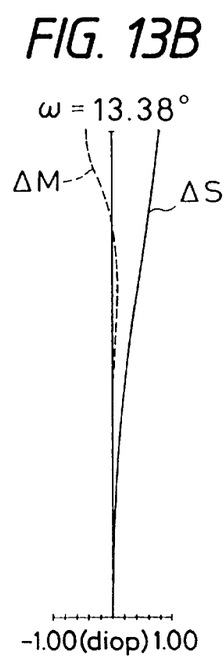
Figure 13C:
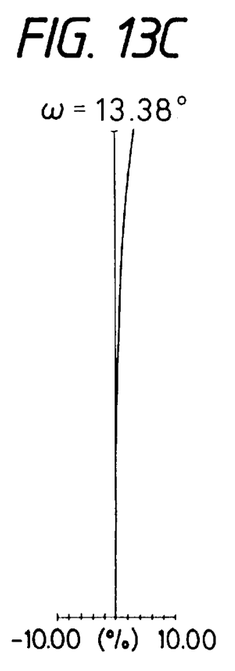

In FIGS. 10A, 10B, and 10C, the finder of this embodiment comprises, in order from the object side, an objective system 9 having a positive refracting power, prisms 10 and 11 for erecting an image, and an eyepiece system 12 having a positive refracting power. The objective system 9 includes, in order from the object side, a first lens unit 9a of a biconcave lens, having a negative refracting power; a second lens unit 9b of a biconvex lens, having a positive refracting power; and a third lens unit 9c of a positive meniscus lens with a convex surface directed toward the image side. Any of these lens units is constructed with a single lens. An object image is formed, by the objective system 9, close to an entrance surface 11a of the prism 11 for erecting the image. The entrance surface 11a of the prism 11 has the function of a field lens.

In the finder of the third embodiment, the magnification is changed by moving the second and third lens units 9b and 9c along the optical axis. Ashperical surfaces are employed for a surfaces directed toward the object side, of the first lens unit 9a; a surface, directed toward the object side, of the second lens unit 9b; both surfaces of the third lens unit 9c; and a surface, directed toward the object side, of the eyepiece system 12.

The following is numerical data of the real image mode variable magnification finder of the third embodiment and of optical members, such as lenses, constituting the finder.

Magnification     0.30 × (wide-angle)-0.48 × (middle)-0.73 × (telephoto)
Half angle of view ($\omega$)    33.24°(wide-angle)-20.26°(middle)-13.38°(telephoto)
Pupil diameter ($\phi$)    5 mm
$r_1 = -12.444$(aspherical)
    $d_1 = 1.00$    $n_1 = 1.58423$    $v_1 = 30.49$
$r_2 = 8.864$
    $d_2 = 8.88$(wide-angle), 4.01(middle), 1.35(telephoto)
$r_3 = 6.511$(aspherical)
    $d_3 = 1.80$    $n_3 = 1.49241$    $v_3 = 57.66$
$r_4 = -55.776$
    $d_4 = 3.95$(wide-angle), 4.65(middle), 1.97(telephoto)
$r_5 = -14.544$(aspherical)
    $d_5 = 2.78$    $n_5 = 1.49241$    $v_5 = 57.66$
$r_6 = -5.477$(aspherical)
    $d_6 = 0.60$(wide-angle), 4.77(middle), 10.11(telephoto)
$r_7 = \infty$
    $d_7 = 14.50$    $n_7 = 1.52542$    $v_7 = 55.78$
$r_8 = \infty$
    $d_8 = 1.22$
$r_9 = 9.102$
    $d_9 = 29.50$    $n_9 = 1.52542$    $v_9 = 55.78$
$r_{10} = \infty$
    $d_{10} = 1.55$
$r_{11} = 12.554$(aspherical)
    $d_{11} = 2.10$    $n_{11} = 1.49241$    $v_{11} = 57.66$
$r_{12} = -61.222$
    $d_{12} = 16.50$
$r_{13}$(eyepoint)
Conic constants and aspherical coefficients
First surface $\kappa = 0$
$A_4 = 9.74050 \times 10^{-4}$, $A_6 = -4.98290 \times 10^{-5}$,
$A_8 = 1.92789 \times 10^{-6}$, $A_{10} = -2.87610 \times 10^{-8}$
Third surface $\kappa = 0$
$A_4 = -5.91214 \times 10^{-4}$, $A_6 = -2.44674 \times 10^{-5}$,
$A_8 = 5.04648 \times 10^{-6}$, $A_{10} = -2.66289 \times 10^{-7}$
Fifth surface $\kappa = 0$
$A_4 = -3.21693 \times 10^{-3}$, $A_6 = 1.06621 \times 10^{-5}$,
$A_8 = -3.53523 \times 10^{-6}$, $A_{10} = -2.40878 \times 10^{-7}$ -continued Sixth surface $\kappa = 0$
$A_4 = -1.01739 \times 10^{-3}$, $A_6 = 2.88015 \times 10^{-5}$,
$A_8 = -2.00661 \times 10^{-7}$, $A_{10} = -1.56861 \times 10^{-7}$
Eleventh surface $\kappa = 0$
$A_4 = -1.19360 \times 10^{-4}$, $A_6 = 1.90290 \times 10^{-6}$,
$A_8 = -6.89420 \times 10^{-8}$, $A_{10} = 6.74820 \times 10^{-10}$ The constant values of Eqs. (1), (2), and (3) in the real image mode variable magnification finder of the third embodiment are as follows:

HF=0.13, HB=1.02 fw'/f$_3$=0.39 (fw'=6.35, f$_3$=16.21)

FIGS. 11A–11C, 12A–12C, and 13A–13C show aberration curves at the wide-angle, middle, and telephoto positions, respectively, of the real image mode variable magnification finder of the third embodiment.

Fourth Embodiment

Figure 14A:
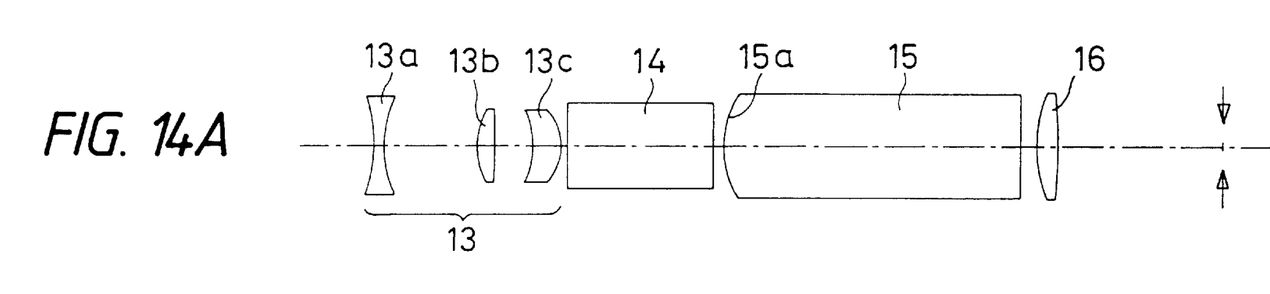
FIGS. 14A, 14B, and 14C are sectional views showing arrangements, each developed along the optical axis, at wide-angle, middle, telephoto positions, respectively, of the real image mode variable magnification finder of a fourth embodiment in the present invention.
Figure 14B:
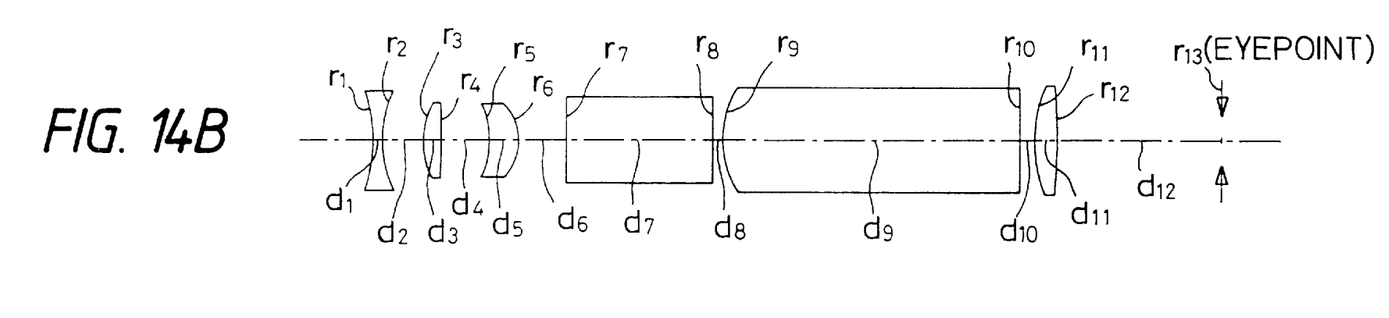
Figure 14C:
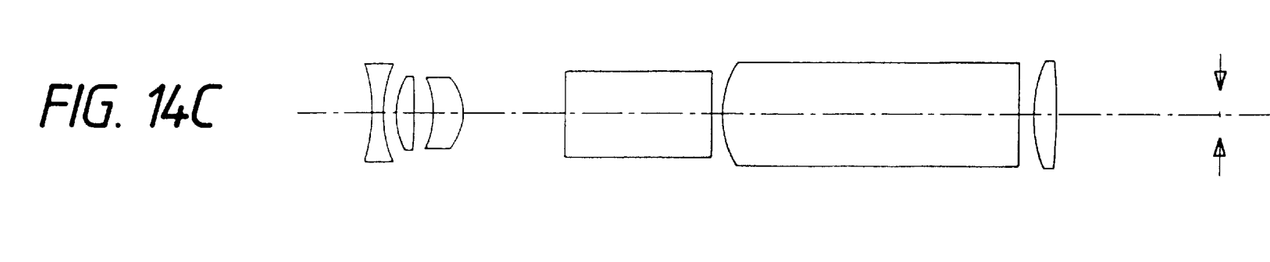
Figure 15A:
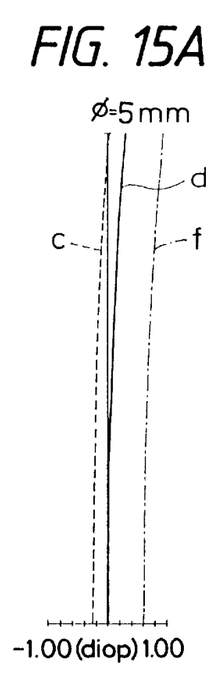
FIGS. 15A, 15B, and 15C are diagrams showing spherical aberration, astigmatism, and distortion, respectively, at the wide-angle position of the real image mode variable magnification finder of the fourth embodiment.
Figure 15B:
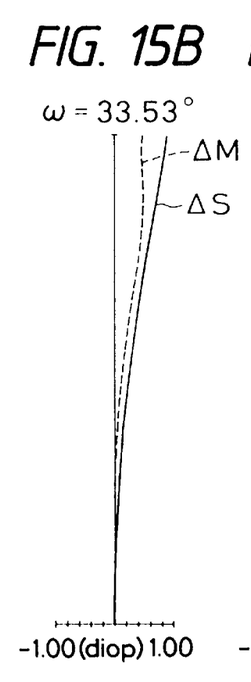
Figure 15C:
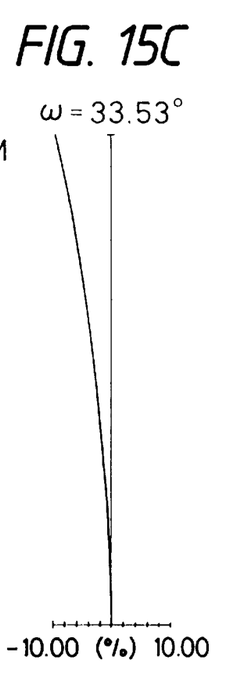
Figure 16A:
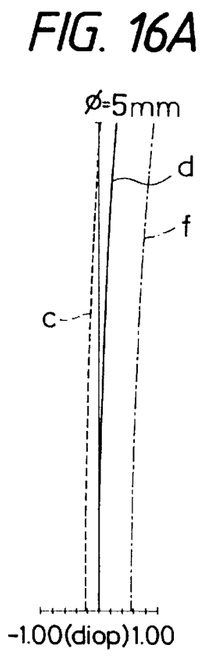
FIGS. 16A, 16B, and 16C are diagrams showing spherical aberration, astigmatism, and distortion, respectively, at the middle position of the real image mode variable magnification finder of the fourth embodiment.
Figure 16B:
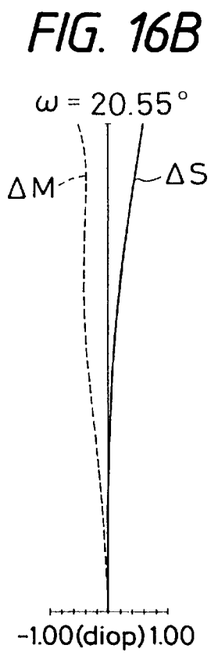
Figure 16C:
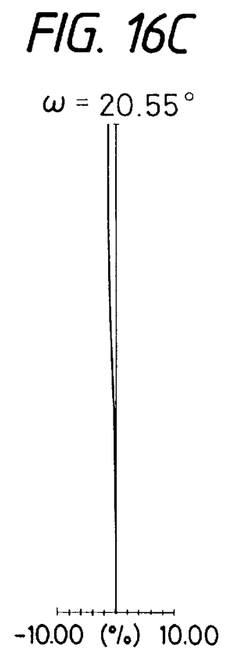
Figure 17A:
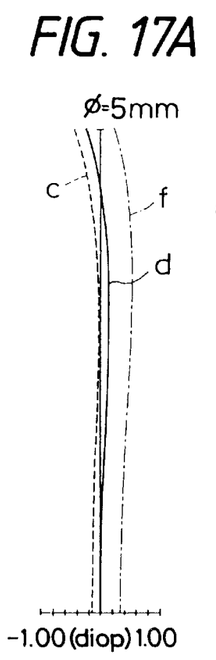
FIGS. 17A, 17B, and 17C are diagrams showing spherical aberration, astigmatism, and distortion, respectively, at the telephoto position of the real image mode variable magnification finder of the fourth embodiment.
Figure 17B:
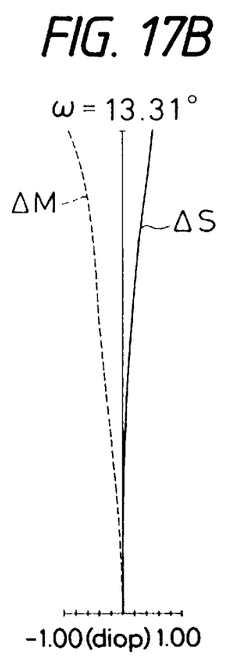
Figure 17C:
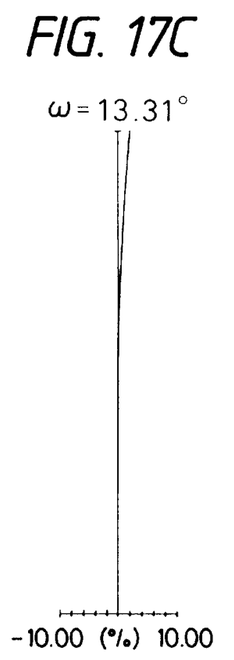

In FIGS. 14A, 14B, and 14C, the finder of this embodiment comprises, in order from the object side, an objective system 13 having a positive refracting power, prisms 14 and 15 for erecting an image, and an eyepiece system 16 having a positive refracting power. The objective system 13 includes, in order from the object side, a first lens unit 13a of a biconcave lens, having a negative refracting power; a second lens unit 13b of a biconvex lens, having a positive refracting power; and a third lens unit 13c of a positive meniscus lens with a convex surface directed toward the image side. Any of these lens units is constructed with a single lens. An object image is formed, by the objective system 13, close to an entrance surface 15a of the prism 15 for erecting the image. The entrance surface 15a of the prism 15 has the function of a field lens.

In the finder of the fourth embodiment, the magnification is changed by moving the second and third lens units 13b and 13c along the optical axis. Ashperical surfaces are employed for a surface, directed toward the object side, of the first lens unit 13a; both surfaces of the second lens unit 13b; both surfaces of the third lens unit 13c; and a surface, directed toward the object side, of the eyepiece system 16.

The following is numerical data of the real image mode variable magnification finder of the fourth embodiment and of optical members, such as lenses, constituting the finder.

Magnification     0.29 × (wide-angle)-0.47 × (middle)-0.72 × (telephoto)
Half angle of view ($\omega$)    33.53°(wide-angle)-20.55°(middle)-13.31°(telephoto)
Pupil diameter ($\phi$)    5 mm
$r_1 = -11.514$(aspherical)
    $d_1 = 1.00$    $n_1 = 1.58423$    $v_1 = 30.49$
$r_2 = 9.303$
    $d_2 = 9.06$(wide-angle), 4.00(middle), 1.34(telephoto)
$r_3 = 6.103$(aspherical)
    $d_3 = 1.72$    $n_3 = 1.49241$    $v_3 = 57.66$
$r_4 = -524.349$(aspherical)
    $d_4 = 3.84$(wide-angle), 4.75(middle), 1.95(telephoto)
$r_5 = -13.628$(aspherical)
    $d_5 = 2.77$    $n_5 = 1.49241$    $v_5 = 57.66$ -continued $r_6 = -5.197$(aspherical)
 $d_6 = 0.60$(wide-angle), $4.76$(middle), $10.21$(telephoto)
$r_7 = \infty$
 $d_7 = 14.67$ $n_7 = 1.52542$ $v_7 = 55.78$
$r_8 = \infty$
 $d_8 = 1.00$
$r_9 = 9.102$
 $d_9 = 29.50$ $n_9 = 1.52542$ $v_9 = 55.78$
$r_{10} = \infty$
 $d_{10} = 1.55$
$r_{11} = 12.554$(aspherical)
 $d_{11} = 2.10$ $n_{11} = 1.49241$ $v_{11} = 57.66$
$r_{12} = -61.222$
 $d_{12} = 16.50$
$r_{13}$(eyepoint)

Conic constants and aspherical coefficients
First surface $\kappa = 0$
$A_4 = 7.83504 \times 10^{-4}, A_6 = -7.46906 \times 10^{-6},$
$A_8 = -4.63678 \times 10^{-7}, A_{10} = 1.84215 \times 10^{-8}$
Third surface $\kappa = 0$
$A_4 = -7.95554 \times 10^{-4}, A_6 = -1.25771 \times 10^{-5},$
$A_8 = 2.56948 \times 10^{-6}, A_{10} = -2.91441 \times 10^{-7}$
Fourth surface $\kappa = 0$
$A_4 = -1.81018 \times 10^{-4}, A_6 = 4.96163 \times 10^{-5},$
$A_8 = -5.23055 \times 10^{-6}, A_{10} = -1.01716 \times 10^{-8}$
Fifth surface $\kappa = 0$
$A_4 = -3.31806 \times 10^{-3}, A_6 = 4.02877 \times 10^{-6},$
$A_8 = -1.49531 \times 10^{-5}, A_{10} = 4.71839 \times 10^{-7}$
Sixth surface $\kappa = 0$
$A_4 = -8.99499 \times 10^{-4}, A_6 = 2.34611 \times 10^{-5},$
$A_8 = -4.98694 \times 10^{-6}, A_{10} = 2.44622 \times 10^{-7}$
Eleventh surface $\kappa = 0$
$A_4 = -1.19360 \times 10^{-4}, A_6 = 1.90290 \times 10^{-6},$
$A_8 = -6.89420 \times 10^{-8}, A_{10} = 6.74820 \times 10^{-10}$ The constant values of Eqs. (1), (2), and (3) in the real image mode variable magnification finder of the fourth embodiment are as follows:

HF=0.01 HB=1.03 fw'/f$_3$=0.40 (fw'=6.16, f$_3$=15.39)

FIGS. 15A–15C, 16A–16C, and 17A–17C show aberration curves at the wide-angle, middle, and telephoto positions, respectively, of the real image mode variable magnification finder of the fourth embodiment.

In the numerical data shown in the above embodiments, $r_1, r_2, \ldots$ represent radii of curvature of individual lens or prism surfaces; $d_1, d_2, \ldots$ represent thicknesses of individual lenses or prisms, or spaces therebetween; $n_1, n_2, \ldots$ represent refractive indices of individual lenses or prisms in the d line; and $v_1, v_2, \ldots$ Abbe's numbers of individual lenses or prisms.

Also, when Z is taken as the coordinates in the direction of the optical axis, Y as the coordinates in the direction normal to the optical axis, $\kappa$ as the conic constant, and $A_4$, $A_6$, $A_8$, and $A_{10}$ as aspherical coefficients, the configuration of each of the aspherical surfaces in the embodiments is expressed by the following equation:

$$Z = \frac{Y^2/r}{1 + \sqrt{1-(1+\kappa)(Y/r)^2}} + A_4Y^4 + A_6Y^6 + A_8Y^8 + A_{10}Y^{10} + \ldots$$

Figure 18A:
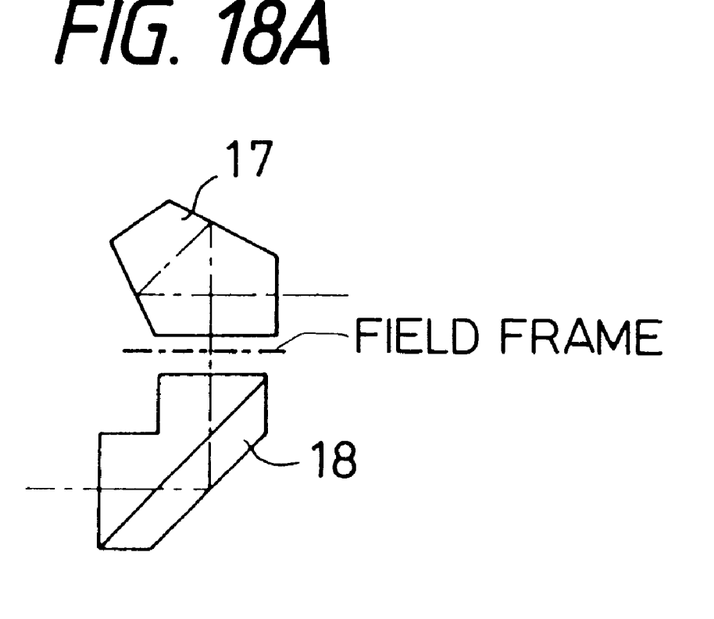
FIGS. 18A and 18B are views showing the configurations of prisms for erecting an image, used in the real image mode variable magnification finder of the present invention.
Figure 18B:
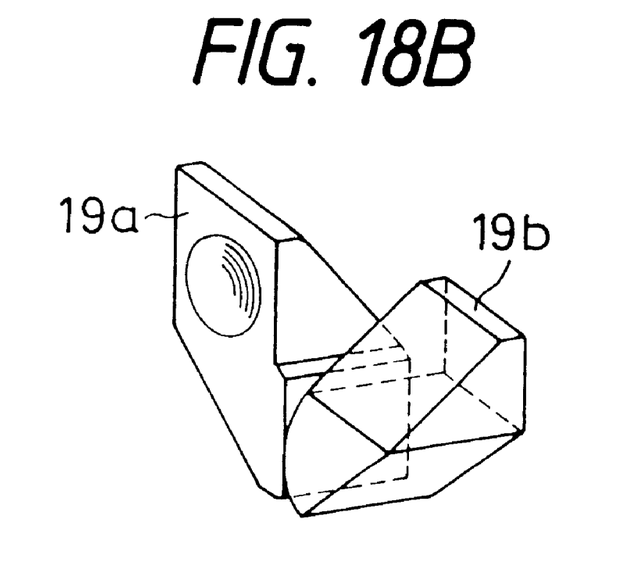

The prisms for erecting the image in each embodiment, as shown in FIG. 18A, are constructed with a roof prism 17 and a pentaprism 18, or as shown in FIG. 18B, with two prisms 19a and 19b.

What is claimed is:

1. A real image mode variable magnification finder comprising, in order from an object side:

an objective system having a positive refracting power;

an image erecting optical system for erecting an image formed by said objective system; and an eyepiece system having a positive refracting power, said objective system including, in order from said object side:

a first lens unit of a negative biconcave lens;

a second lens unit of a positive lens; and a third lens unit of a positive meniscus lens with a convex surface directed toward an image side, said first lens unit being fixed and said second lens unit and said third lens unit being moved along an optical axis, thereby changing a magnification of said finder.

2. A real image mode variable magnification finder according to claim 1, satisfying the following condition:

0.2<fw/f$_3$<0.8 where fw is a focal length of said objective system when an arbitrary point is taken as a reference in a process of a magnification change ranging from a wide-angle position to a middle position of said finder and f$_3$ is a focal length of said third lens unit.

3. A real image mode variable magnification finder according to claim 2, satisfying the following condition:

0.3<fw'/f$_3$<0.5 where fw' is a focal length of said objective system at the wide-angle position.

4. A real image mode variable magnification finder comprising, in order from an object side:

an objective system having a positive refracting power;

an image erecting optical system for erecting an image formed by said objective system; and an eyepiece system having a positive refracting power, said objective system including, in order from said object side:

a first lens unit with a negative refracting power;

a second lens unit with a positive refracting power; and a third lens unit with a positive refracting power, said finder satisfying the following conditions:

|HF|<HB 0.2<fw/f$_3$<0.8 where HF is a primary principal point position of said second lens unit, HB is a secondary principal point position of said third lens unit, fw is a focal length of said objective system when an arbitrary point is taken as a reference in a process of a magnification change ranging from a wide-angle position to a middle position of said finder, and $f_3$ is a focal length of said third lens unit.

5. A real image mode variable magnification finder according to claim 4, wherein said first lens unit of said objective system is constructed with a biconcave lens and said third lens unit is constructed with a positive meniscus lens with a convex surface directed toward an image side.

6. A real image mode variable magnification finder according to claims 4 or 5, satisfying the following condition:

$$0.3 < fw'/f_3 < 0.5$$

where fw' is a focal length of said objective system at the wide-angle position.

* * * * *